Feb. 21, 1933.          E. C. NEWCOMB          1,898,459
               CRANK SHAFT BALANCING
               Filed April 26, 1928          3 Sheets-Sheet 1
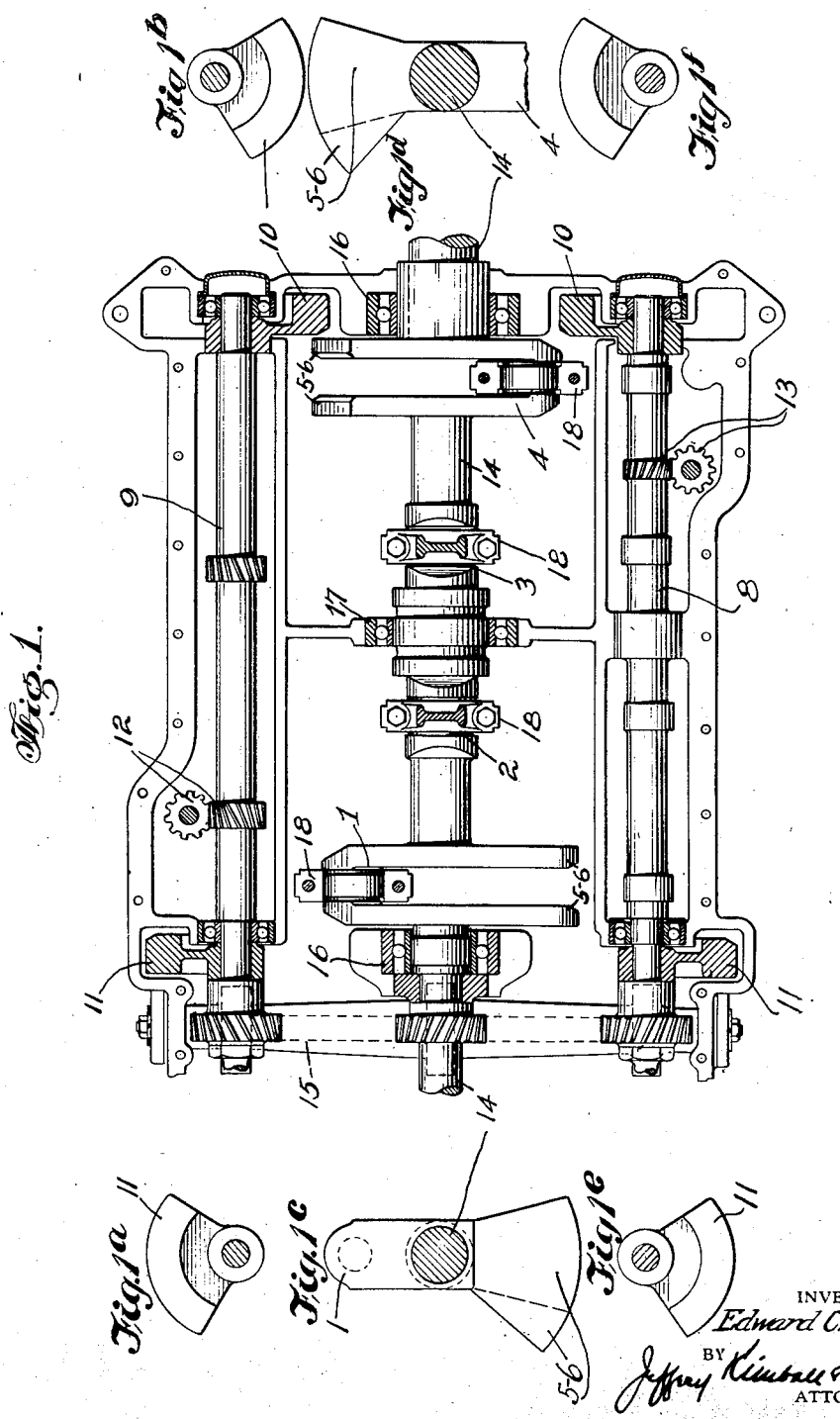
INVENTOR
Edward C. Newcomb
BY
ATTORNEY

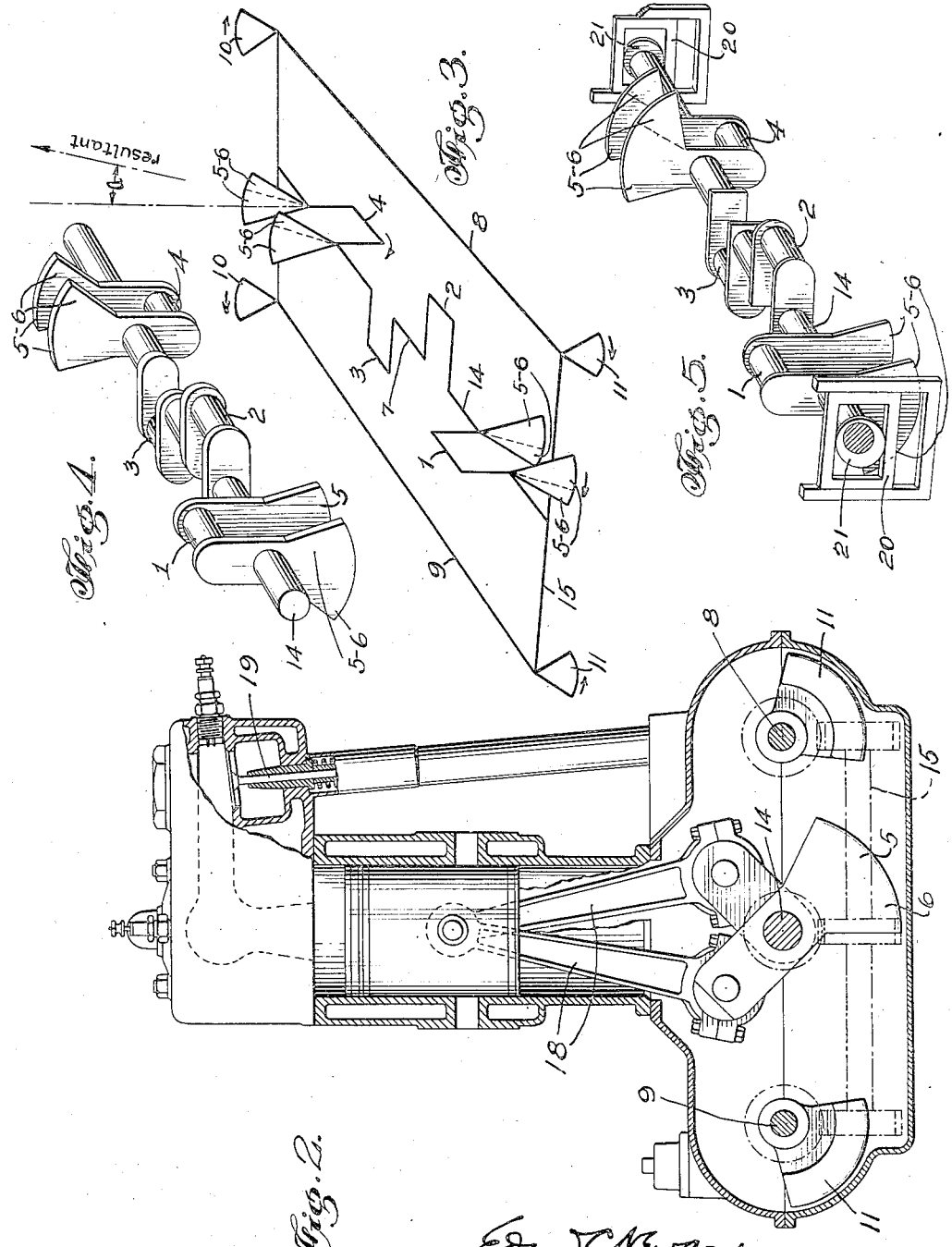

Feb. 21, 1933. E. C. NEWCOMB 1,898,459
CRANK SHAFT BALANCING
Filed April 26, 1928  3 Sheets-Sheet 3

INVENTOR
Edward C. Newcomb
BY
ATTORNEY

Patented Feb. 21, 1933

1,898,459

UNITED STATES PATENT OFFICE

EDWARD C. NEWCOMB, OF NORTH SCITUATE, MASSACHUSETTS

CRANK SHAFT BALANCING

Application filed April 26, 1928. Serial No. 273,024.

The object of the invention is the balancing of crank shafts of internal combustion engines and like machines, and more particularly two-cycle four cylinder engine crank shafts, and the invention consists in the disposition of the balancing masses according to the principles herein disclosed, whereby proper balance is obtained by the addition of minimum weight to the engine and minimum complication of structure.

In the accompanying drawings—

Fig. 1 represents in horizontal section, the crank shaft and case of a two-cycle four cylinder engine having the invention applied;

Figures 1a, 1b and 1c; and Figures 1d, 1e and 1f are detailed cross sectional views respectively showing in elevation the relative positions of the weights on each shaft with reference to each other, and the shaft on which said weights are mounted.

Fig. 2 a transverse vertical section of such engine;

Fig. 3 a perspective diagram of the balancing system thereof;

Fig. 4 a perspective of its crank shaft;

Fig. 5 a modified form, in perspective, and

Figure 6:
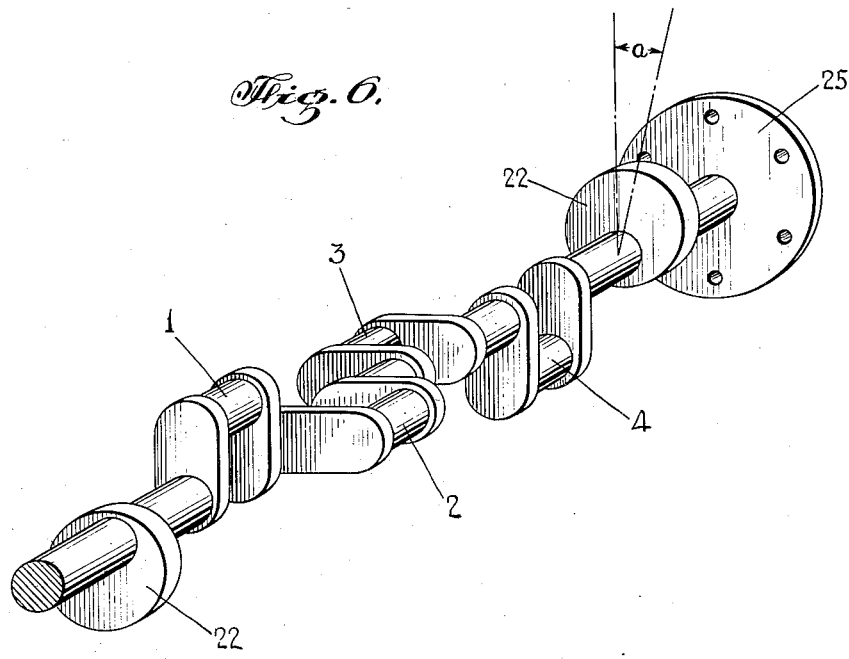
Figure 7:
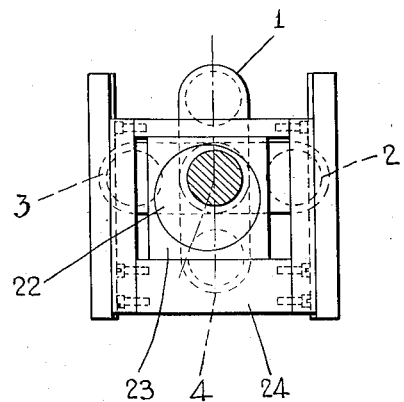

Figs. 6 and 7, perspective and end views of the preferred form.

Referring first to the diagram, the four cranks are marked 1, 2, 3 and 4 respectively and are angularly spaced to accommodate a two cycle firing order of 1—3—4—2, that is to say, cranks 1 and 4 are on opposite sides of the shaft axis in the same plane, and cranks 2 and 3 are on opposite sides of such axis in a plane at ninety degrees to the plane of cranks 1 and 4. As thus arranged, it will be understood that all the cranks have equal mass and radius so that the shaft is statically balanced, i. e. when rolled on level ways, or spun on centers it will come to rest at any point. It will be understood that the static balance of the shaft includes also the lower ends of the connecting rods for each piston carried by each crank pin; these are not shown in the diagram, but are of course all equal.

The centrifugal forces set up in this shaft when rotating are dynamically balanced by the application thereto of counter-weighting marked 5—6, fixed at opposite ends of the shaft and on opposite sides of the shaft axis and preferably in the transverse planes of the two crank cheeks of each terminal crank. Those portions of these weights which are marked 5 are equal to the mass moments of their respective cranks 1 and 4 including the connecting rod ends on the latter, and their centers of mass are spaced 180° from each other occupying the axial plane which passes through cranks 1 and 4. In this relation these weight portions 5 respectively counteract an otherwise unbalanced force couple, produced by cranks 1 and 4, acting in the plane of said cranks and tending to rock the shaft about neutral point 7.

The portions of these counterweights which are marked 6 neutralize and balance a similar force couple produced by cranks 2 and 3 acting in the common plane of those cranks and likewise tending to rock the shaft about said neutral point 7 in the plane of said cranks. The balancing of this last mentioned force couple could be accomplished by applying weights of mass equal to said cranks and their rod ends, to the shaft at the locations of such cranks 2 and 3, and on opposite sides of the axis respectively therefrom, but according to this invention the same effect is obtained by the use of the weight portions 6, located at the positions of cranks 1 and 4, and which by reason of their greater distance from point 7 may be of less mass, thus saving weight for the crank-shaft as a whole. Such portions 6 could be located adjacent the weight portions 5 and in the common plane of cranks 2 and 3, but for simplicity of design, they are combined with weight portions 5 to form what may be termed single composite counterweights, the resultant centrifugal force of which is the same as if such portions were in fact in such planes and acts in a direction making an angle $a$ to the plane of cranks 1 and 4. As a matter of convenience and compactness these weights at each end are formed as additions to each of the cheeks of cranks 1 and 4 as above stated, resulting in a shaft having the appearance of Fig. 4, although they can be otherwise fixed to the shaft adjacent its opposite ends as will later appear. Inasmuch as the counter-weighting is on opposite sides of the shaft axis and 180° apart, it is clear that the static balance of the shaft has not been affected by their addition. In the case in hand the angle *a* is 18° 26′, being more or less according to the longitudinal separation of the cranks or the length of the shaft.

The primary and secondary inertia forces due to the reciprocating masses of the pistons, piston pins and the small or upper ends of the connecting rods act on this shaft in the direction to rock it about a transverse horizontal axis at neutral point 7. The secondary forces or harmonics will be seen to be balanced by the crank arrangement; that is to say, the vertical forces at cranks 1 and 4 are equal and in the same direction since these cranks are at equal distances from neutral and the same is true also of cranks 2 and 3 but in the opposite sense, the result being that the cranks 1 and 4 will produce an upward vertical force when the cranks 2 and 3 are producing an equal downward force, thus completely balancing against secondary forces.

The primary inertia vertical forces tend to produce a vertical rocking movement of the shaft or the engine as a whole about the neutral axis. These reciprocating forces are counteracted and neutralized according to this invention by providing force couples of equal value but opposite directions simultaneously active on the crank shaft or engine, and such opposing force couples may be produced in various ways, provided they do not themselves involve unbalanced horizontal components. According to the diagram of Figure 3, such reciprocating balance is secured by the employment of two lay shafts 8 and 9 driven at equal speed with the crank shaft and in directions opposite to each other and preferably journalled in the same horizontal plane and at equal distances from the crank shaft. Weights 10 and 11 of appropriate mass are applied to the opposite ends of each of these lay shafts spaced 180° apart on each of them, the weights 10 being phased in the opposite sense to crank 4, to which they are adjacent, and the weights 11 in the opposite sense to crank 1, to which they are adjacent. Inasmuch as weights 10 are of equal mass and rotate in opposite directions, and in opposite phase, each neturalizes any horizontal force exerted by the other as will be clear from the diagram, and together they exert a vertical force opposite and equal to that produced by the reciprocating elements on that side of the neutral point 7, the same being also true of weights 11, which balance each other as respects horizontal forces, and similarly counteract the vertical forces of the reciprocating parts on their side of the neutral point 7. The centers of gravity of the weights 10 and 11 are in the same plane and are so located on the shaft that such plane is in phase with the plane of the centers of gravity of composite weights 5—6 on the crank shaft, so that both are vertical planes at the same instant. As indicated in Figs. 1 and 2 the lay shafts 8 and 9 may be respectively the cam shaft and an accessories shaft for the engine, by which is meant a shaft from which the oil or water pump, the generator, or other devices, may be conveniently driven. In Figure 1 the spiral gears 12 may be assumed to represent an oil pump drive and spiral gears 13, a generator drive as the case may be. The two lay shafts are driven in phase with the crank shaft marked 14 through a cross shaft 15 having spiral gear connections as indicated with the three shafts. The crank shaft is journalled at its ends in bearings 16 and at its center in bearing 17 and the several connecting rods are marked 18 and the intake valves 19; the rest of the engine construction will be recognized from the drawings without further description. The phase relation of the weights 5, 6 and 10 and 11, above referred to, is illustrated by the projected figures adjacent these parts in Fig. 1.

Figure 5 shows a crank shaft of this invention statically and dynamically balanced in respect of rotational forces on the same principle as above explained, and in respect of the vertical forces by means of two reciprocating masses one at each end of the engine or crank shaft and of sufficient weight and proper phase to give the necessary neutralizing vertical force equivalent to that produced by the combined action of weights 10 and weights 11. These masses most conveniently take the form of scotch yokes 20 reciprocated vertically in ways provided for the purpose by eccentrics 21 fast to each end of the crank shaft. The unbalance produced by the rotation of these eccentrics, being purely a rotating force, is utilized to assist the counter-balancing of the rotational forces of the cranks, that is to say the masses of the two eccentrics are taken into consideration in determining the dynamic balance of the crank shaft, making the counter-weights 5, 6 somewhat lighter than is required to give the same balance in the form of Figure 3. The directions of their respective eccentricities coincide with the plane of the centers of gravity of the composite weights 5—6 and being 180° apart such eccentrics have no effect on the static balance.

Figs. 6 and 7 illustrate the application of the same principles carried still farther and represent the preferred form of this invention. In this case the two eccentrics 22 and their block-shaped straps 23 which revolve with them do all the work of the composite counter-weights 5—6 of Fig. 3 and of the counter-weights 5—6 and eccentrics 20 of Fig. 5. The straps 23 form a proper mechanical connection between the eccentrics and the reciprocating yokes 24. The centers of gravity of these eccentrics and their straps, occupy the same plane as were occupied by the centers of gravity of the composite weights 5—6, that is to say, such plane makes an angle $a$ with the common plane of cranks 1 and 4, but their respective masses are smaller than said composite weights since they are situated at greater distances from the neutral or center point of the shaft and take the benefit of longer couple-arms. They are desirably integral with the shaft and by giving them sufficient diameter the strap member which is to be associated with the eccentric at the flywheel end of the shaft, next to the flywheel flange 25, will be large enough to be assembled by being passed over the several cranks, so that it can thus be made in one piece which is desirable. The reciprocating yokes 24 have sufficient mass, it will be understood, to counterbalance the primary inertia forces the same as the yokes 20 in Fig. 5 and the effect otherwise is the same except that the design of the shaft is now materially simplified and its cost of production correspondingly reduced.

The particular weights of the several counter balances above referred to are not herein stated inasmuch as they are different for different shaft and connecting rod dimensions and the mathematics by which the correct values may be determined, according to the principles of this invention, will be readily applied from what has been said. Within the principles described and identified in the claims, it will now be apparent that other two-cycle or like crank shafts having the natural unbalance characteristic of the shaft described can be properly and simply brought to perfect balance of the primary centrifugal and inertia forces and likewise complete balance as to secondary harmonics; the higher harmonics produce such insignificant unbalance that they are inappreciable with minimum addition of weight and complication of parts.

I claim:

1. Balancing means for multiple engine crank shafts comprising counter weights on said shaft for neutralizing the rotating force couples of the cranks thereof and means operatively connected with said shaft for neutralizing vertical primary inertia force couples comprising oppositely phased masses mounted for vertical reciprocation adjacent the opposite ends of said shaft.

2. Balancing means for multiple throw crank shafts having reciprocal pistons connected with the cranks thereof comprising oppositely phased counter weights on said shaft adapted to neutralize rotating force couples thereof, and a vertically reciprocating scotch yoke operatively connected with each of said counter weights balancing the primary inertia force couples due to piston reciprocation.

3. In a four-cylinder two-cycle engine having a crank shaft with its terminal cranks extending in opposite directions in the same axial plane and its intermediate cranks extending in opposite directions in an axial plane at right angles to the terminal cranks, counter weights applied respectively to the terminal portions of said shaft being in mutual static balance and both of said weights dynamically balancing the rotary force couples of all of said cranks and a vertically reciprocating counter balancing scotch yoke at each end of the crank shaft of appropriate mass and phase to balance the primary reciprocating forces acting on the shaft and operatively connected to the shaft.

4. A counter weighted crank shaft having its counter weights located beyond its terminal cranks and comprising oppositely phased composite counter weights at each end adapted to balance rotational force couples and vertically reciprocal scotch yokes operatively connected with said shaft to balance primary inertia force couples.

5. Balancing means for four cylinder two cycle engines comprising, oppositely phased eccentric counterweights mounted respectively at each end of the engine crankshaft to oppose rotating force couples of the cranks of said shaft, reciprocating masses supported from the frame of the engine adjacent to the ends of said shaft, and driving connections between said counterweights and said reciprocating masses.

In testimony whereof, I have signed this specification.

EDWARD C. NEWCOMB.